J. BOGENBERGER.
SASH BAR CONSTRUCTION.
APPLICATION FILED NOV. 15, 1913.

1,187,491.  Patented June 20, 1916.

WITNESSES:
James Keating
Fred Bogenberger Jr.

INVENTOR:
John Bogenberger

UNITED STATES PATENT OFFICE.

JOHN BOGENBERGER, OF MILWAUKEE, WISCONSIN.

SASH-BAR CONSTRUCTION.

1,187,491.    Specification of Letters Patent.    Patented June 20, 1916.

Application filed November 15, 1913. Serial No. 801,191.

*To all whom it may concern:*

Be it known that I, JOHN BOGENBERGER, a citizen of the United States, residing at Milwaukee, in the county of Milwaukee and State of Wisconsin, have invented certain new and useful Improvements in Sash-Bar Construction, of which the following, together with the accompanying drawing, is a specification.

My invention relates to improvements in two-piece metallic muntin bars of windows, and it pertains more especially, among other things, to the mechanism for connecting the two opposing members of the muntin bars together, which are respectively located upon the respective sides of the window glass.

My invention is explained by reference to the accompanying drawings, in which—

Figure 1:
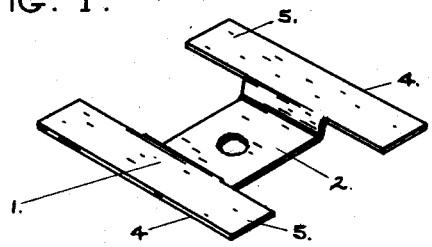
Figure 2:
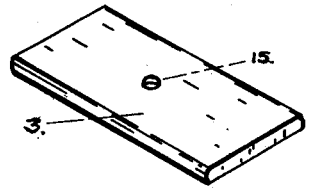
Figure 3:
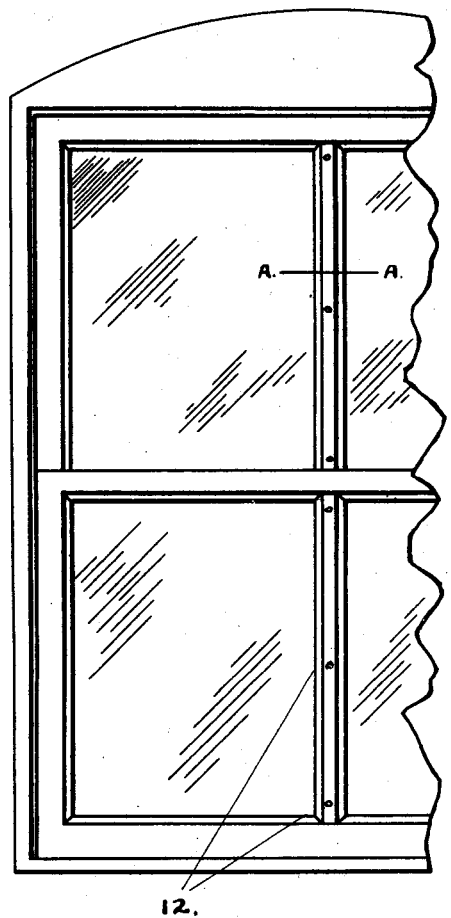
Figure 4:
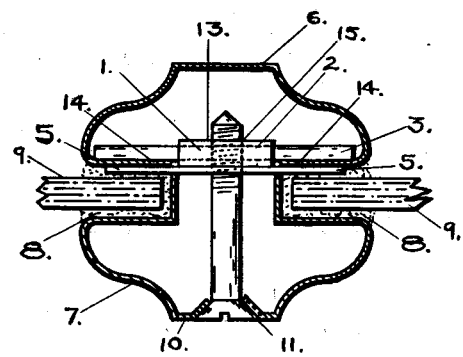
Figure 5:
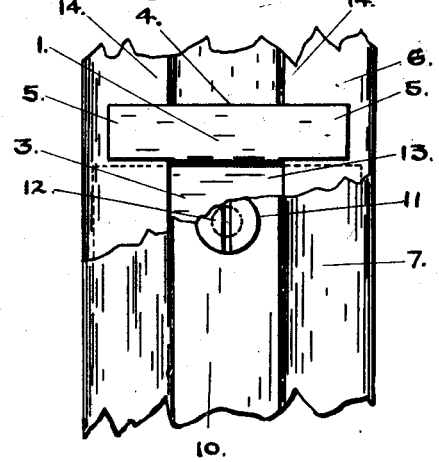

Figure 1 is a perspective view of a metallic bracket, and Fig. 2 is a perspective view of a threaded plate which coöperates with the fastening bolts to hold the respective members of the muntin bars in their proper relative position to each other. Fig. 3 is a front view, part broken away, of a window frame provided with my improved muntin bars. Fig. 4 is a transverse section drawn on line A, A of Fig. 3, and Fig. 5 is a detail, part broken away showing several of the coöperating parts of the muntin bar.

Like parts are referred to by the same reference numerals throughout the several views.

1 is a metallic bracket which is provided with a central aperture for the reception of a fastening bolt. The central portion 2 of the bracket is upset or pressed outward or downward as shown in Fig. 1 for the reception of the threaded plate 3, and the plate 2 is provided with a screw threaded aperture 15 for the reception of the threaded end of the bolt 11. The muntin bar comprises the sheet metal member 6, which is preferably located on the exterior of a building and the sheet metal member 7 which is preferably located on the interior of a building, and said members 6 and 7 are retained in rigid contact with each other by the screw threaded bolt 11. The member 7 is provided with a countersunk depression 10 for the head of said bolt, as shown in Fig. 4. Preparatory to securing said members 6 and 7 together the bracket 1 and screw threaded plate 3 are first slidably secured to the inwardly projecting flanges 14 of the member 6.

It will be understood that the central portion of the plate 3 is placed upon the downward depressed portion 2 of the bracket 1 when the ends of the members 5, 5 of said bracket are brought beneath the inwardly projecting flanges 14, 14 of the member 6, as shown in Fig. 4, while the ends of the member 3 are brought upon the opposite sides of said inwardly projecting flanges 14, whereby said bracket 1 and screw threaded plate 3 are slidably secured to said inwardly projecting flanges 14 of the member 6 before said bolt 11 is inserted in the threaded aperture 15, and whereby said screw threaded plate 3 and bracket 1 may be slid longitudinally of the member 6 until brought in alinement with the inner end of said screw threaded bolt 11, whereby the threaded end of said screw threaded bolt may be readily inserted through said central aperture and in the screw threaded aperture 15 of said threaded plate. It follows that when the bolt 11 is thus turned down in the threaded aperture 15 the two opposing members 6 and 7 of the muntin bar are rigidly secured in their proper relative position to each other, as shown in Fig. 4. A plurality of bolts 11 are inserted at short distances apart throughout the entire length of the muntin bar as indicated by the reference numeral 12 in Fig. 3 of the drawings, and consequently a separate bracket 1 and screw threaded plate 3 are required for each bolt 11.

The reference numeral 4, shown in Figs. 1 and 5 indicate the plates, the ends 5 of which bear against the exterior surface of the inwardly projecting flanges 14; while the reference numeral 13, shown in Figs. 4 and 5 refer to the central plate through which said central aperture is formed.

8 is putty or other plastic material by which the glass 9 is retained in place.

Having thus described my invention, what I claim as new and desire to secure by Letters Patent, is:—

In a metal muntin bar comprising a pair of longitudinal members, one of said members having its opposite edges bent inwardly to form a pair of spaced opposing flanges and inclosing a longitudinal space within the member, of a bracket having a central depression extending into the space between the opposing flanges and provided with a central aperture, a screw threaded plate located in the longitudinal space and seated within the depression and extending behind the said flanges, a bolt extending through the other longitudinal member and adapted to be secured in said plate.

JOHN BOGENBERGER.

Witnesses:
FRED BOGENBERGER, Jr.,
JAMES KEATING.